United States Patent
McCarrick et al.

(10) Patent No.: US 7,218,098 B2
(45) Date of Patent: May 15, 2007

(54) SENSING AN OPERATING PARAMETER OF A TARGET CONCEALED FROM A SENSOR BY AN INTERPOSED COMPONENT

(75) Inventors: Daniel McCarrick, Canton, MI (US); James Merner, Canton, MI (US); Steven Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 10/659,944

(22) Filed: Sep. 12, 2003

(65) Prior Publication Data

US 2005/0057244 A1 Mar. 17, 2005

(51) Int. Cl.
*G01P 3/487* (2006.01)
*G01P 3/488* (2006.01)

(52) U.S. Cl. .......... 324/173; 324/207.25; 324/207.15; 324/207.22

(58) Field of Classification Search .......... 324/207.25, 324/173, 174, 207.15, 207.22
See application file for complete search history.

(56) References Cited

U.S. PATENT DOCUMENTS

| | | | |
|---|---|---|---|
| 3,599,320 A | 8/1971 | Brickner et al. | |
| 4,056,747 A | 11/1977 | Orris et al. | |
| 4,721,864 A * | 1/1988 | Goossens | 307/106 |
| 5,315,464 A * | 5/1994 | Tsujino | 360/99.08 |
| 5,486,758 A | 1/1996 | Hammerle | |
| 5,825,176 A | 10/1998 | Babin et al. | |
| 6,260,423 B1 * | 7/2001 | Garshelis | 73/862.336 |
| 6,528,989 B1 * | 3/2003 | Hansen | 324/207.12 |
| 6,853,099 B2 * | 2/2005 | Uchida | 310/12 |
| 7,019,516 B2 * | 3/2006 | Tokunaga et al. | 324/207.25 |

FOREIGN PATENT DOCUMENTS

GB  758755  10/1956

\* cited by examiner

*Primary Examiner*—Reena Aurora
(74) *Attorney, Agent, or Firm*—David B. Kelley; Miller, Sobanski, & Todd

(57) ABSTRACT

An assembly that includes a target component mounted for rotation about an axis, a sensor mounted adjacent the inner member and directed toward the inner member to measure the rotational speed of the target component and an outer component interposed between the sensor and the target component. Low magnetic permeability of the outer component is assured by appropriate selection of the material, maintaining the concentration of martensite in the outer component below a reference concentration as indicated by certain reference indices such as the Instability Function, and/or by maintaining the temperature at which a stamping operation is performed on the inner member above a predetermined temperature.

18 Claims, 6 Drawing Sheets

SENSING AN OPERATING PARAMETER OF A TARGET CONCEALED FROM A SENSOR BY AN INTERPOSED COMPONENT

BACKGROUND OF THE INVENTION

This invention relates to the field of sensing an operating condition when the target is concealed from a sensor by another component.

Currently electronic transmission controls rely on accurate information regarding the rotational speed of transmission components located within a case. The speed signals are used as input information to sophisticated powertrain control algorithms. The speed of most components in the case can be accessed directly by magnetic sensing devices, but occasionally such access can only be obtained upon relocating the target component adjacent a sensor. Frequently these relocations compromise the power flow arrangement in the transmission and add cost and complexity to the mechanical design, hydraulic actuation and electronic controls. Indirect access using surrogate speeds in combination with algorithmic corrective calculations, in place of the true target speed, sacrifices response time and accuracy.

When the target component has interposed between it and the speed sensor another component formed of ferrous metal, magnetic flux exchange between the sensing device and the surface profile of the target element will be attenuated. To avoid this difficulty it is preferable that the interposed component have low magnetic permeability while providing high structural strength.

U.S. Pat. No. 5,825,176 describes an apparatus in which the speed of a rotating inner member is represented by a signal produced by a speed sensor located adjacent the outer surface of an outer member, which covers at least partially the inner member. The outer member is formed with a pattern of angularly and axially spaced windows through its thickness. These windows provide intermittent direct access of a magnetic flux path from the sensor to the target component and interrupted direct access as each window rotates past the flow path.

In an alternate approach using non-magnetic material for the interposed element, a high cost magnetic ring is pressed onto the target component in order to provide sufficient magnetic signal penetration through the interposed outer component.

SUMMARY OF THE INVENTION

The present invention produces a time varying electrical signal that represents rotational speed, or another suitable operating variable of the target component, the signal being used for electronic transmission control. Interposed between the signal-producing sensor and the target component is a second component having low magnetic permeability, which permits uninterrupted passage of magnetic flux between the sensor and target.

One embodiment of the present invention for producing a signal indicating rotational speed, includes a target component mounted for rotation, a second component having a portion thereof at least partially overlapping the target component; and a sensor including a coil and a magnet generating a flux path extending through said portion of the second component to said target component, the flux path having a magnetic reluctance that varies with rotation of the target component, the coil carrying a signal generated in response to changes in said reluctance, the signal having a predetermined pear-to-peak amplitude and a frequency indicative of the rotational speed of the target component.

A system for determining a rotational speed of a target component according to the present invention includes another component having at least a portion surrounding the target component and being formed of material having a relative magnetic permeability equal to or less than 25.0, a magnetic source generating a magnetic flux path within which the target component and second component are located, rotation of the target component causing changes in a characteristic of the magnetic flux path, a detector generating a position signal that varies in response to changes in said characteristic, and a controller for determining a rotational speed of the target component based on values of said position signal over time.

Because the interposed element must also carry relatively large drivetrain torque loads, the material of that component has high structural strength and is readily welded without loss of strength and without adversely affecting the function of the sensor.

Another advantage of the present invention is avoiding need to relocate components in order that a sensor has direct access to a target. Instead, the target component may be covered or otherwise concealed from the sensor, thereby avoiding the complexity and increase variable costs and manufacturing cost that such component relocation causes.

The interposed, concealing or covering component according to the present invention may be formed of stainless steel that is resistant to martensite formation, which is a crystalline phase transformation that frequently occurs when a component of stainless steel is formed by stamping. The mechanical strength of the interposed element according to the present invention is high and provides the opportunity to minimize the thickness and weight of that element. The possibility of deforming the part is eliminated because no post-stamping heat treatment is required.

No separate magnetic ring mounted on the target element is required to enhance the magnetic flux transfer through the speed sensor. A conventional splined surface profile on the target element, or another tooth profile, provides sufficient signal excitation. Importantly, there is no need to compromise the optimal power flow through the transmission by relocating components.

DESCRIPTION OF THE PREFERRED EMBODIMENT

Figure 1:
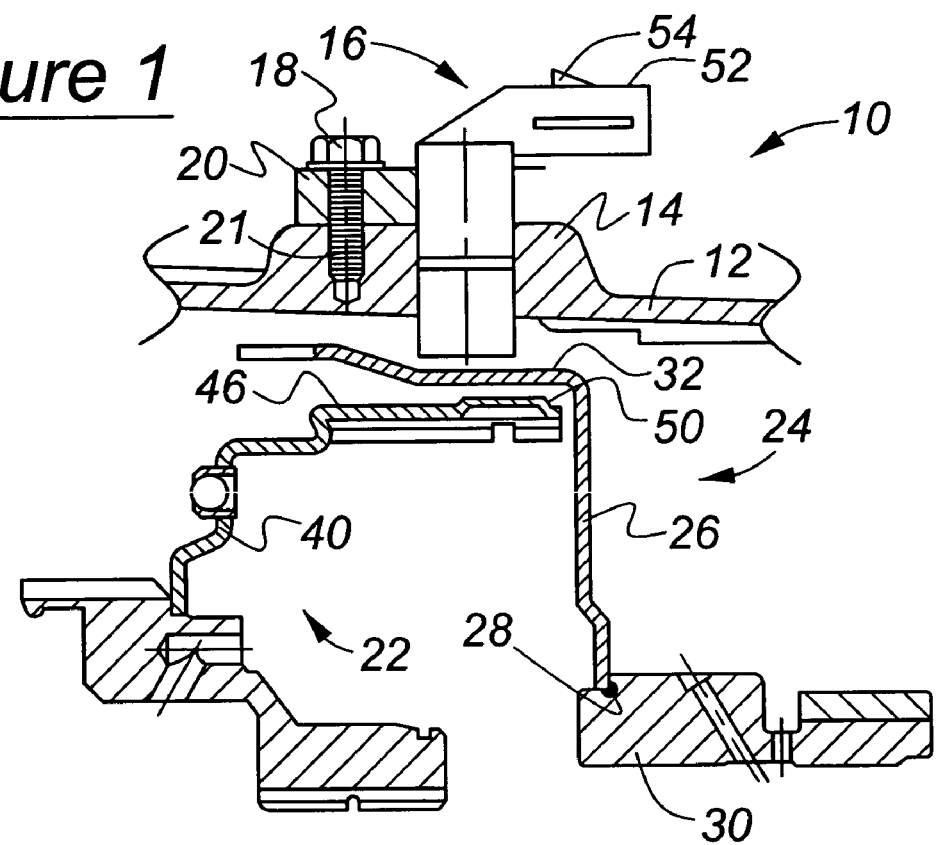
FIG. 1 is a schematic diagram representing a cross section through of a portion of an automatic transmission showing a speed sensor, target component and outer component.

Turning now to FIG. 1, the components of a transmission 10 are enclosed in a transmission case 12, which may be formed with a locally increased wall thickness at a boss 14. A speed sensor 16 is mounted on the transmission case at the boss by a bolt 18 passing through a flange 20 extending from the sensor. The bolt engages threads 21 tapped into the thickness of boss 14. Interposed between sensor 16 and the outer surface of a forward clutch cylinder 22, the target component whose speed of rotation is to be determined, and sensor 16 is a shell 24 having a radial disc 26. The shell is welded or riveted at 28 to a reverse sun gear wheel 30, and includes an axially directed arm 32 extending between sensor 16 and the outer surface of cylinder 22.

Sensor 16 provides a surface 52 adapted to receive an electrical connector that latches to the sensor at 54 and completes an electrical connection with terminals (not shown) connected to a coil of the sensor.

Shell 24 rotates at a different speed than that of cylinder 22 under most operating conditions, and it may be stationary or synchronous with cylinder 22 at other conditions. The location of shell 24 between sensor 16 and target cylinder 22 presents a problem using conventional technology for producing an electric signal produced by the sensor representing the speed of the target.

Figure 2:
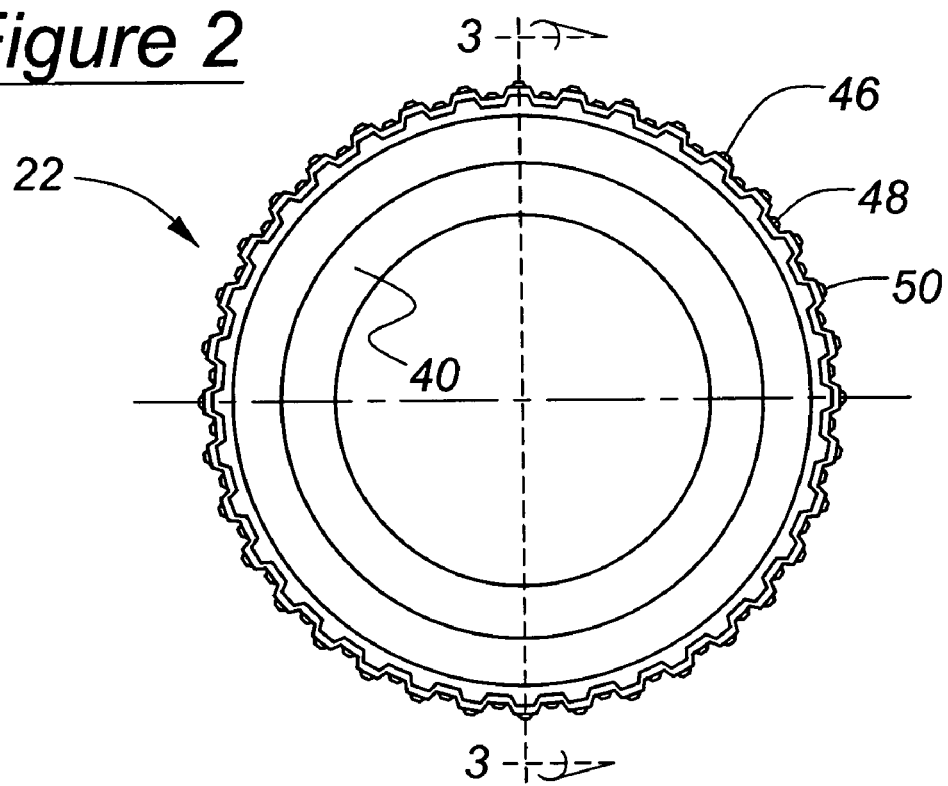
FIG. 2 is an end view of the target component of FIG. 1.
Figure 3:
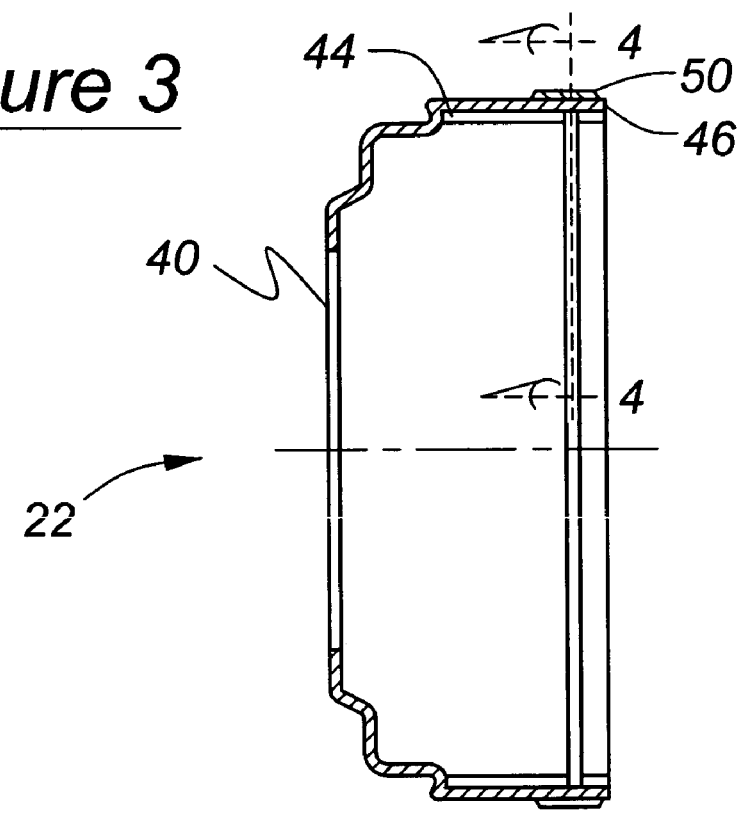
FIG. 3 is a cross section taken at plane 3—3 of FIG. 2.
Figure 4:
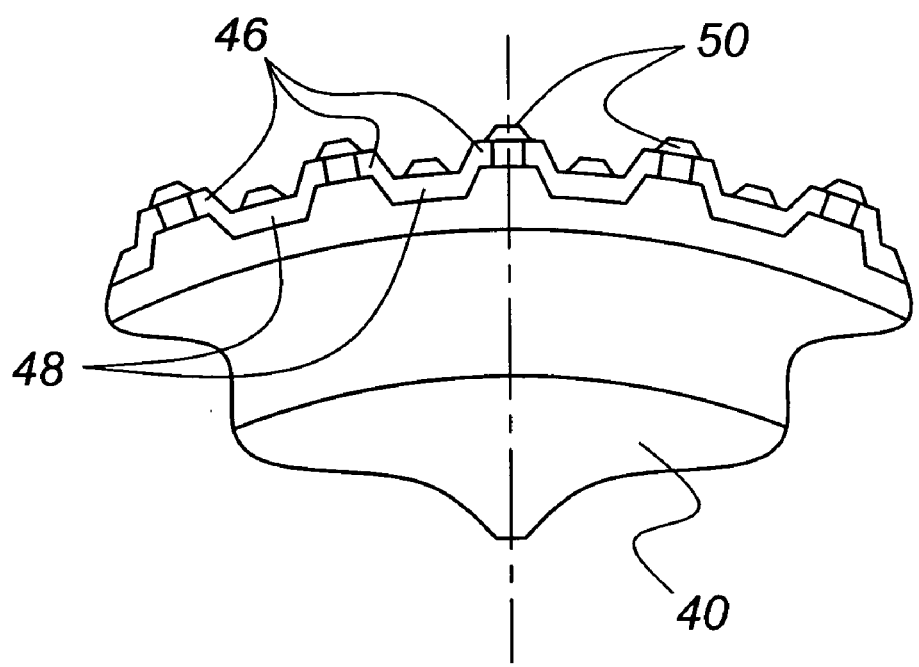
FIG. 4 is a cross section taken at plane 4—4 of FIG. 3.

Referring now to FIGS. 2–4, the forward clutch cylinder 22 is formed with a radial web 40 that extends radially outward in a series of steps to an axially directed flange 44. Located on the outer surface of flange 44 are angularly spaced spline teeth 46, each tooth extending radially outward between successive lands 48, located between each of the splines. The crest of each spline is also formed with a radially directed rib 50. In this way the air gap located between the inside surface of the sensor 16 and the outer surface of cylinder 22 varies in length as the spline teeth 46 and lands 48 pass under the sensor while cylinder 22 rotates about its axis. The material of the target component 22 may be any material including a broad range of highly magnetic ferrous materials, preferably SAE J403 1010 low carbon steel.

Figure 5:
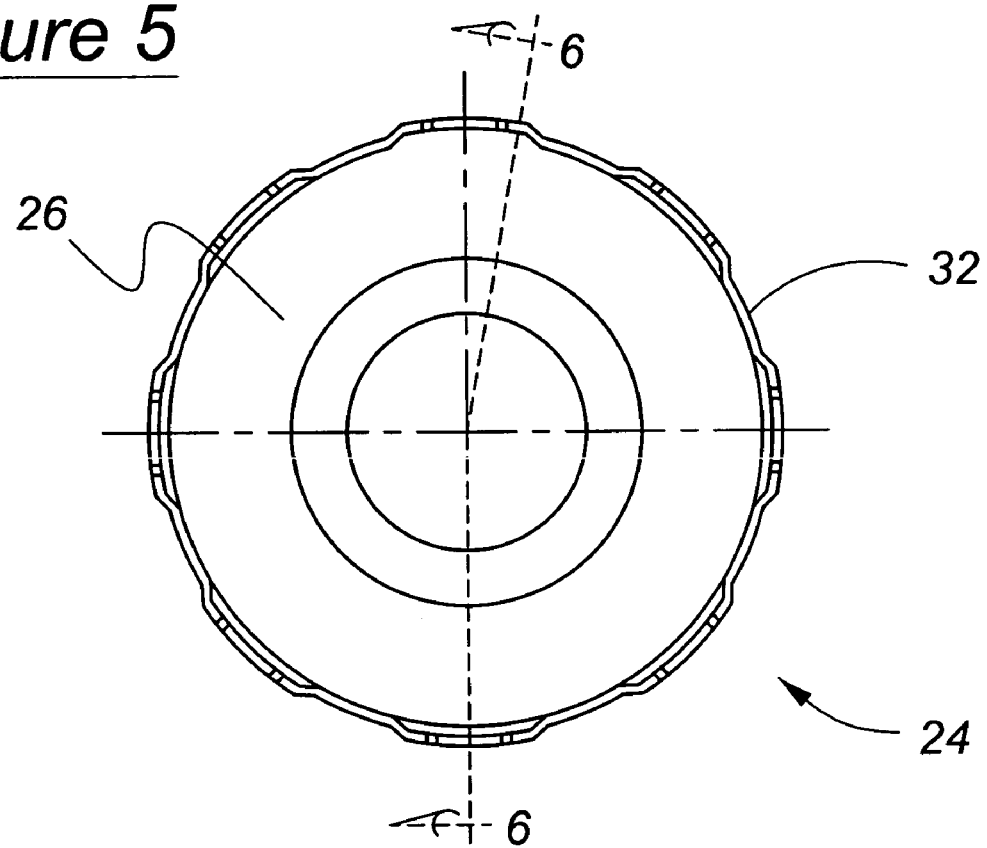
FIG. 5 is an end view of the outer component.
Figure 6:
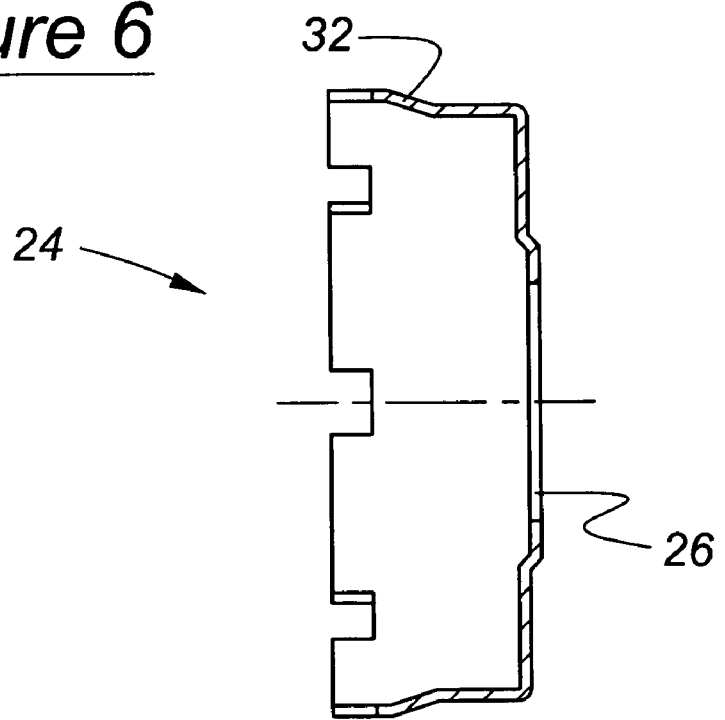
FIG. 6 is a cross section taken at plane 6—6 of FIG. 5.

FIGS. 5 and 6 show a detailed configuration of the second component or shell 24, which includes a radial disc 26 and an axially directed flange 32 extending from the disc. The material of the second component 26 is selected as described below.

Figure 7:
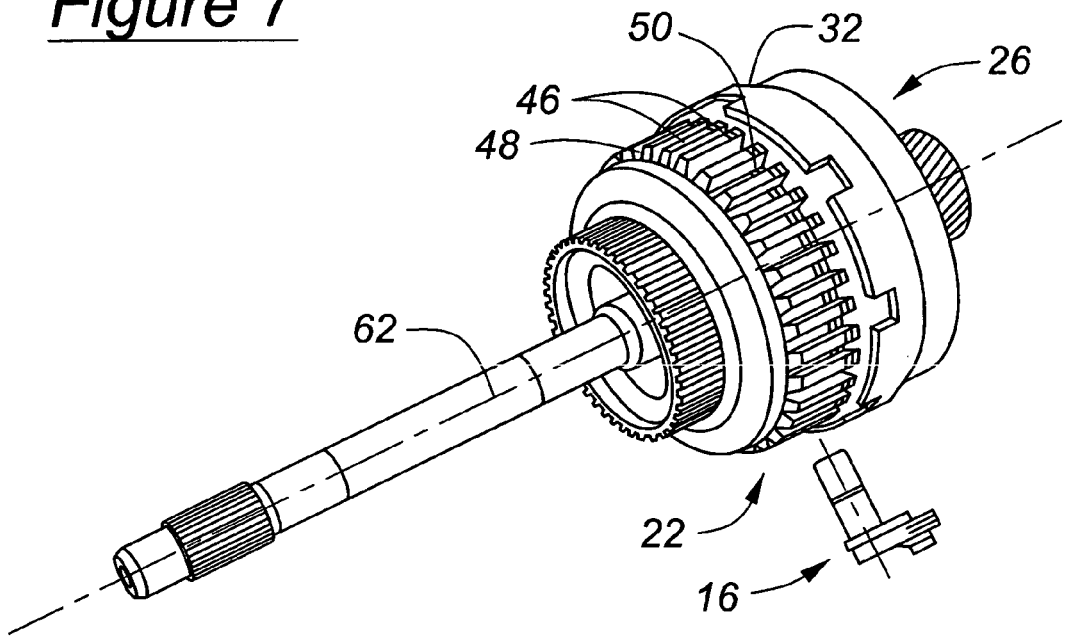
FIG. 7 is an isometric view showing the location of the speed sensor and target component with an outer component moved axially to uncover the target.

In order to show clearly the target component 22, FIG. 7 shows the second, outer component 24 moved axially rightward along axis 62 from the as-assembled position, which shown best in FIG. 1. Clutch cylinder 22 and shell 24 rotate about axis 22. As assembled, flange 32 covers the target component and blocks the direct path between the sensor 16 and target 22.

Figure 8:
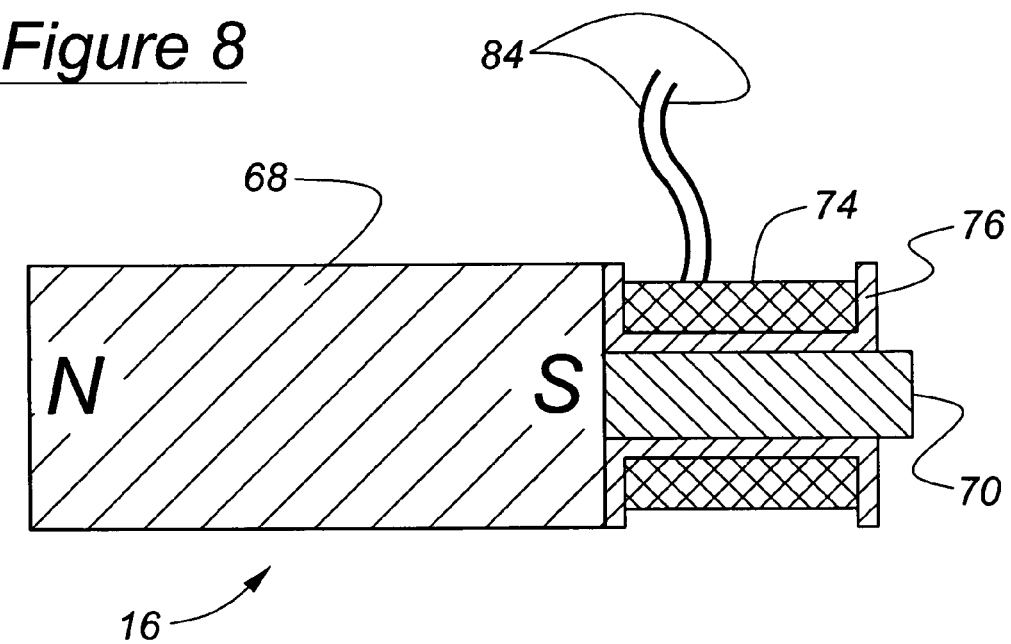
FIG. 8 is a schematic cross section of the sensor about a central plane.

The sensor is directed toward the interior of case 12 and is located directly, radially above target cylinder 22. FIG. 8 shows schematically the sensor in cross section. The sensor is preferably a variable reluctance speed sensor that includes a magnet 68 having magnetically opposite poles, an iron pole piece 70, and an inductive coil 74 that is wound around a plastic bobbin 76. The coil and bobbin surround the pole piece 70 so that magnetic flux change generated by the magnet and teeth 46 generates a corresponding electrical signal in the coil. The coil includes a pair of lead wires 84 connected to a controller 82 (shown in FIG. 11) having a signal conditioning circuit or programmed logic for processing the electrical signal generated by the sensor 16, and determining from that signal 80 the rotational speed of target 22.

As the target component rotates, the spline teeth 46 rotate past the sensor 16 causing a sinusoidal variation in the flux due to changes in reluctance. This variation in reluctance, and therefore flux, generates a frequency and amplitude variation in the electrical signal generated on the coil of the sensor. The frequency of that signal is directly related to the rotational speed of the target component 22.

By selecting appropriate material for the second component such that the material has a relatively low concentration of martensite, its magnetic permeability is low. Therefore, the signal induced in the coil of the sensor is substantially unaffected by the presence of the second component, which is essentially magnetically transparent to the sensor.

Figure 9:
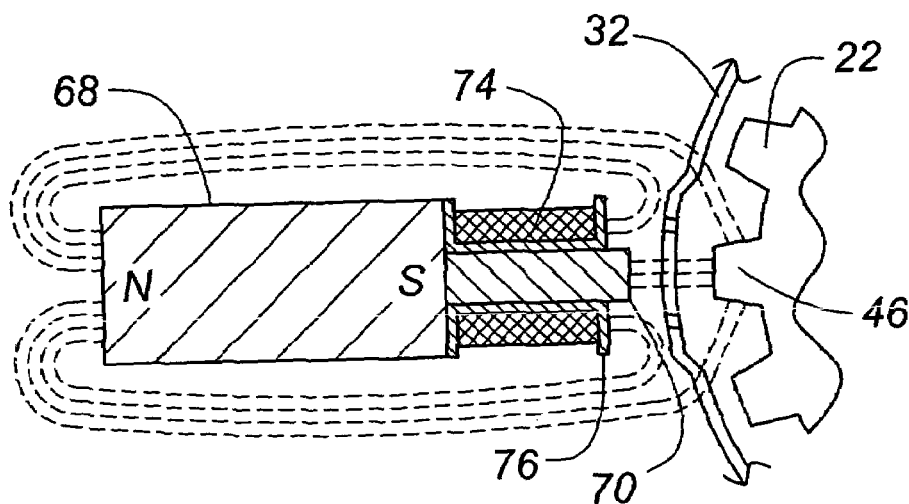
FIGS. 9 and 10 schematically represent the flux paths generated by the sensor.
Figure 10:
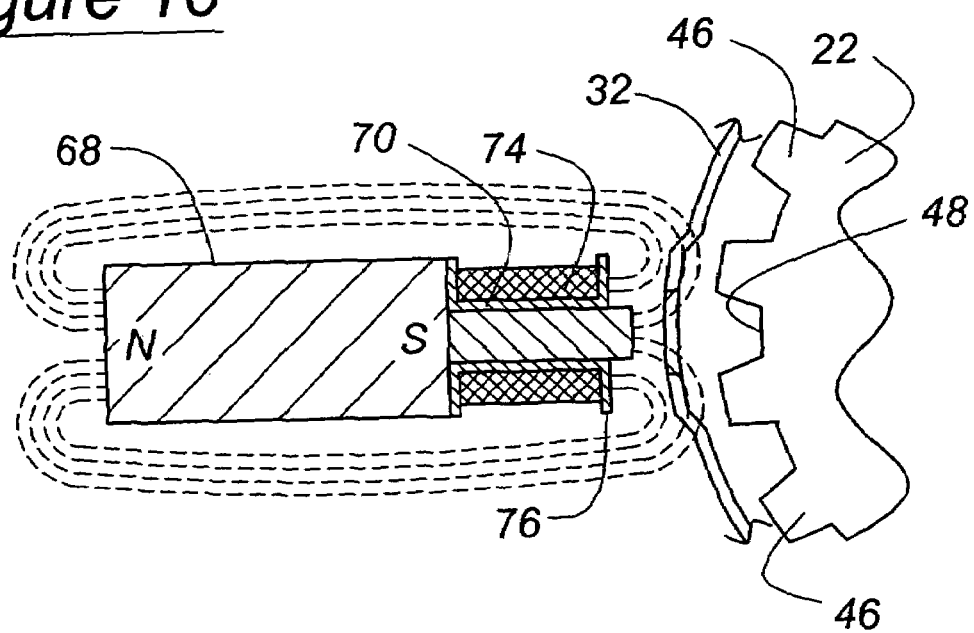

FIGS. 9 and 10 schematically represent the flux path generated by the magnet 68 in the vicinity of the target component 22 and second component 24. FIG. 9 shows one of the teeth 46 of the target component angularity aligned with the sensor's pole piece 70. Flux generated by the magnet flows from the pole piece 70 through the material of the second component portion 32, which overlaps the target 22, along the axially directed teeth 46 on the outer surface of the target component 22, and back to the opposite pole end of the sensor 16.

FIG. 10 illustrates schematically the flux path generated by the sensor and passing in the land 48 between alternate teeth 46 on the target 22. The flux path is the same as the flux path shown in FIG. 9, except that the reluctance of the target component to flux is changed because, rather than being aligned with a tooth 46 on the target component, the sensor is now aligned with a land 48 between successive teeth on the target component 22. This change in the reluctance, and therefore flux, causes a corresponding change in the output signal generated on the coil 74 of sensor 16.

Figure 11:
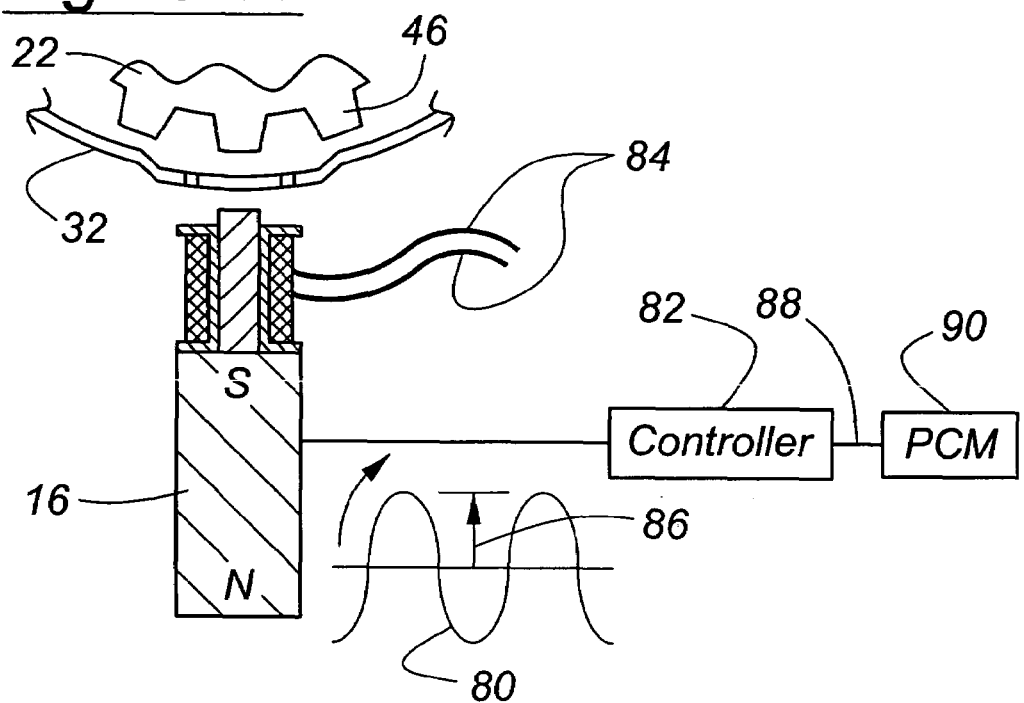
FIG. 11 is a schematic diagram of a system for determining the rotational speed of the target.

The rotational speed of the target 22 is determined from the signal generated in the coil, which is connected to an appropriate signal conditioning device, which may include a microprocessor for analyzing the signal. As FIG. 11 shows, the voltage signal 80 generated by sensor 16 varies sinusoidally with time and has a predetermined amplitude 86 (preferably about 240 mV). The amplitude is recognizable by, and compatible with the signal conditioning circuit of a controller 82 that converts the signal induced in coil 74 to the rotational speed of target 22. The signal 80 is monitored continually by the controller. The state of the sampler goes high or to 1 each time the sampled voltage reaches +240 mV, and that time is recorded. Similarly the state goes low or to zero each time the sampled voltage reaches −240 mV. The controller 82 maintains a running count of the number of high states and low states. Electronic memory accessible to the controller stores the number of teeth 46 on the target component, which in a preferred example is 34 teeth per revolution. The controller 82 uses the length of the period between the occurrence of 34 high states to determine the speed of rotation of the target 24 and to produce a digital signal representing that speed, which is carried on line 88 to a powertrain control module 90. This speed information is used to control various functions of the transmission including electronically controlled gear ratio changes.

A magnetic field is produced due to the presence of the permanent magnetic located in the sensor 16. As cylinder 22 rotates, the magnetic field expands and collapses continuously as the splines 46 and lands 48 rotate pass the sensor. This expansion and collapse of the magnetic field induces in the coil an electrical signal having an acceptable voltage amplitude and a frequency that is an accurate measure of the rotational speed of cylinder 22. The controlling factors affecting the magnitude of the induced voltage are the magnet strength, coil turns, rotational speed of the target 22, air gap, diameter of the target wheel, and the material of the component 24 interposed between sensor 16 and target cylinder 22. Preferably the sensor produces a signal whose peak-to-peak magnitude is greater than ±240 mV (480 mV peak-to-peak) when the speed of the target 22 is 450 rpm. Depending on the requirements of the electronic system that receives and processes the signal produced by sensor 16, such as a powertrain control module for a motor vehicle, other acceptable peak-to-peak magnitudes of the sensor signal include ±72 mV (144 mV peak-to-peak) and ±160 mV (320 mV peak-to-peak).

A sensor capable of producing an acceptable output signal magnitude is a variable reluctance sensor available from HI-STAT Manufacturing, a division of StoneRidge, Inc. of Novi, Mich., the sensor having StoneRidge part number PN 8624-201. The sensor may be an electromagnetic sensor, a Hall-type sensor (such as Allegro ATS640-two-wire), or a magneto-resistive MR-type sensor.

Acceptable materials for the outer component 32 include, by way of example but not limitation, aluminum, titanium, stainless steel, and other materials having a relative magnetic permeability, relative to that of air, in the range of 1.0–25.0. Austenitic stainless steel is generally acceptable for the outer component provided suitable steps are taken to maintain relative magnetic permeability equal to or less than 25.0. Martensite concentration of stainless steel and other materials provides another indication of the acceptability of a material for the portion 32 of the second component 24 that is located between the sensor 16 and target component 22. Ferritic stainless steel, which is magnetic, is preferably avoided because its relative magnetic permeability exceeds 25.0. Martensitic stainless steel, which is also magnetic, is preferably avoided unless its martensite concentration is low, or its relative magnetic permeability is less than 25. These factors affect the ability of the sensor 16 to generate a signal having an acceptable peak-to-peak amplitude without excessive electrical noise.

Although austenitic stainless steel is nonmagnetic, it is susceptible to changes in crystalline structure during forming operations, particularly due to stamping. These changes in crystalline structure increase its martensite concentration. Therefore, care should be taken, as disclosed and described below, in selecting a stainless steel material for the second component 32, during its forming operations, and after forming to assure that the martensite concentration of the second component 24 will not prevent the sensor from generating an acceptable signal, one that is compatible with the requirements of the control system to which it is input.

Figure 12:
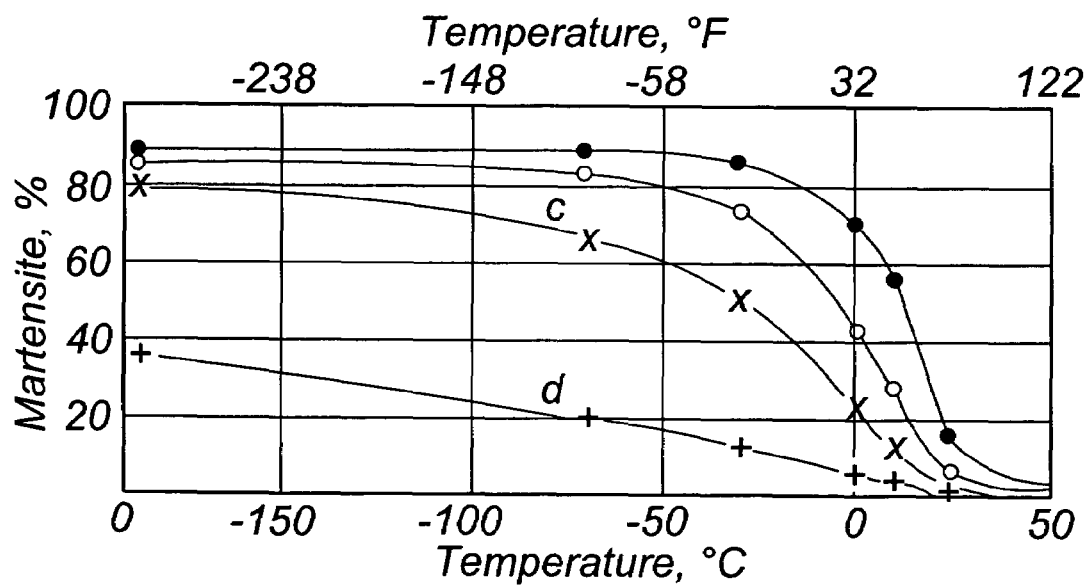
FIG. 12 is a graph illustrating the temperature dependence of martensite formation at various magnitudes of plastic strain.

The presence of martensite in the second component 24 blocks the flow of flux from the sensor magnet 68 to the target component 22 and lowers sensor voltage output. In addition, the degree of magnetism present in the second component 24 has only a slight influence on the magnitude of voltage output by the sensor. The shell 24 is a stamped part, and the stamping operation itself affects the concentration of martensite near the stamped metal. Furthermore, the temperature of the metal of the second component 24 when it is stamped also influences the concentration of martensite in the shell 24. As FIG. 12 shows, the concentration of martensite declines gradually with increasing temperature of the metal being stamped, and that concentration rapidly declines when the temperature of the material when stamped is in the approximate range −50° C. to +25° C.

When the material of the second component 24 is stainless steel, its martensite concentration can be predicted with reference to an instability factor, I (f), determined from the following equation, (1): I(f)=(37.19)−51.25(% C)−2.59(% Ni)−1.02(% Mn)−0.47(% Cr)−34.4(% N), wherein the symbols represent the concentrations by weight of carbon, nickel, manganese, chromium and nitrogen, respectively, in the material. This equation was published in U.S. Pat. No. 3,599,320.

Alternatively, the martensite concentration in the metal of the second component can be predicted from the martensite deformation, MD (30), which is determined from the following equation (2): MD (30)=(413)−462(% C+% N)−9.2(% Si)−8.1(% Mn)−13.7(% Cr)−9.5(% Ni)−18.5(% Mo), and Martensite Formation $M_s$, which is determined from the following equation (3): $M_s$=75(14.6−% Cr)+110 (8.9−Ni)+60(1.33−Mn)+50(0.47−Si)+3000[0.068−(C+N)]. Equations (2) and (3) appeared in the ASTM Specialty Handbook For Stainless Steel, 3d Edition, August 1999, published by ASTM International.

It has been discovered that if I (f) is less than 2.9, and the temperature at which component 24 is stamped from stainless steel is greater than approximately 32° F., then the martensite concentration in the second component adjacent the sensor (as measured by a ferrite scope) is less than 30 percent, and the peak-to-peak voltage magnitude of the signal produced by the sensor is within an acceptable range. If the stamping temperature is increased, then the instability factor and its corresponding martensite concentration can be increased, and the peak-to-peak voltage magnitude of the signal produced by the sensor is within an acceptable range. In another example of the application of the present invention, wherein I (f) is less than 1.0, and the minimum temperature of the material when stamped is greater than 50° F., the concentration of martensite in the stainless steel is less than 15 percent, and the peak-to-peak voltage magnitude of the signal produced by the sensor is within an acceptable range. Preferably, the material of shell 24 is AISI 304 low carbon stainless steel.

A method for producing the second component, the shell 24, includes obtaining a certification of the concentrations of the various alloy elements in the sheet stock from which component 24 is to be stamped. Next, the instability factor is calculated using equation (1) and the martensite concentration is predicted from the magnitude of I(f). Then shell 24 is stamped from flat sheet stock provided its stamping temperature is greater than a temperature that would produce a martensite concentration in component 22 at the sensor exceeding a martensite concentration that would result in an output signal from the sensor outside an acceptable range. Next, a ferrite scope or magnetic permeability meter can be used to measure the concentration of martensite in the second component at the location of the sensor and target component. The shell can be secured at 28 by riveting or welding to the gear wheel 30 without loss of structural strength and without adversely affecting the condition of the shell in the vicinity of the sensor. The shell is installed in the assembly, provided the ferrite scope indicates the concentration of martensite will result in an acceptable sensor signal. If the ferrite scope check is not used, then the stamped shell can be installed in the assembly.

This process reduces the magnetic permeability of the shell so that it is magnetically transparent to the sensor. In this way the sensor produces an electric signal whose frequency is a correct measure of the rotational speed of the forward cylinder clutch 22.

Although the form of the invention shown and described here constitutes preferred embodiments of the invention, it is not intended to illustrate all possible forms of the invention. Words used here are words of description rather than of limitation. Various changes in the form of the invention may be made without departing from the spirit and scope of the invention.

We claim:

1. An apparatus for producing a signal representing rotational speed, comprising:
   a target component supported for rotation;
   a sensor facing the target;
   a second component interposed between the sensor and target component such that the target is continually hidden from view of the sensor by the second component, supported for rotation between the target and sensor, and formed of material having a relative magnetic permeability equal to or less than 25.0; and
   the sensor including a coil and a magnet generating a flux path extending through the second component to said target component, the flux path having a reluctance that varies with rotation of the target component, the coil carrying a signal generated in response to changes in said reluctance, the signal having a frequency representing the rotational speed of the target component.

2. The apparatus of claim 1, wherein the signal has a predetermined amplitude, and said second component is made of material that has substantially no effect on the amplitude of said signal.

3. The apparatus of claim 1 wherein the signal has a predetermined amplitude, and said second component is made of material that has substantially no effect on a magnitude of the reluctance of the flux path.

4. The apparatus of claim 1, wherein the material of the second component has a concentration of martensite that is less than thirty percent.

5. The apparatus of claim 1, wherein material of said second component is a member of the group consisting of aluminum, titanium and stainless steel.

6. The apparatus of claim 1, wherein the target component includes an outer surface facing the sensor and having a plurality of mutually spaced surface variations on the outer surface.

7. The apparatus of claim 6, wherein said surface variations are radially extending teeth, each tooth spaced angularly from an adjacent tooth by a land, the distance between adjacent teeth being uniform and substantially equal.

8. The apparatus of claim 1 wherein the magnet generates a magnetic field, and the sensor further comprises a ferritic core, and the coil is wound around the core.

9. The apparatus of claim 1 wherein said second component is stainless steel formed by stamping at a temperature greater than 32 degrees F.

10. The apparatus of claim 1 wherein said the second component is of stainless steel having an instability factor that is less than 2.9 percent, and is formed by stamping at a temperature greater than 32 degrees F.

11. The apparatus of claim 1 wherein said the second component is of stainless steel having a concentration of martensite that is less than 15 percent, and is formed by stamping at a temperature greater than 50 degrees F.

12. The apparatus of claim 1 wherein said the second component is formed of stainless steel having an instability factor that is less than 1.0 percent, and formed by stamping at a temperature greater than 50 degrees F.

13. An apparatus for producing a signal indicating rotational speed, comprising:
   a target component mounted for rotation;
   a sensor;
   a second component supported for rotation between the target component and the sensor, continuously covering a path between the sensor and the target component, and formed of material having a relatively low magnetic permeability; and
   the sensor including a coil and a magnet generating a flux path extending through said portion of the second component to said target component, the flux path having a magnetic reluctance that varies with rotation of the target component, the coil carrying a signal generated in response to changes in said reluctance, the signal having a frequency indicative of the rotational speed of the target component.

14. The apparatus of claim 13 wherein the material of said second component has substantially no effect on an amplitude of said signal.

15. The apparatus of claim 13 wherein the material of said second component has substantially no effect on magnetic reluctance of the flux path between the sensor and target component.

16. A system for determining a rotational speed of a target component, the system comprising:
   a second component continuously blocking a path to the target component from a magnetic flux source, supported for rotation between the target component and the sensor, and formed of material having a relative magnetic permeability equal to or less than 25.0;
   the magnetic flux source generating a magnetic flux path within which the target component and second component are located, rotation of the target component causing changes in a characteristic of the magnetic flux path;
   a detector generating a position signal that varies in response to changes in said characteristic; and
   a controller for determining a rotational speed of the target component based on values of said position signal over time.

17. A method for determining a rotational speed of a target component the method comprising the steps of:
   forming the second component of material having relatively low magnetic permeability;
   locating the second component between a sensor and the target component such that a path between the target component and the sensor is continuously blocked by the second component;
   generating a magnetic flux path that passes from the sensor through the second component and extends to the target component, rotation of the target component causing a change in a characteristic of the magnetic flux path;
   rotating the second component between the sensor and the target component;
   generating a signal that varies in response to a change in said characteristic; and
   determining a rotational speed of the target component based on values of said signal over time.

18. The method of claim 17 further comprising the step of forming the target component of nonmagnetic material with teeth separated mutually by spaces located between the teeth.

* * * * *